Sept. 16, 1969     E. HENRY-BIABAUD     3,467,406
SUSPENSION SYSTEMS OF VEHICLES
Filed Oct. 10, 1967     2 Sheets-Sheet 1
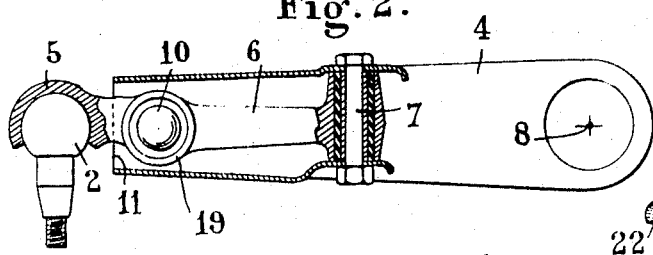
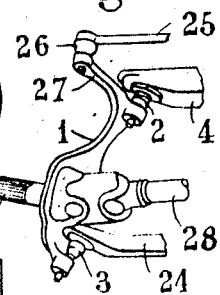
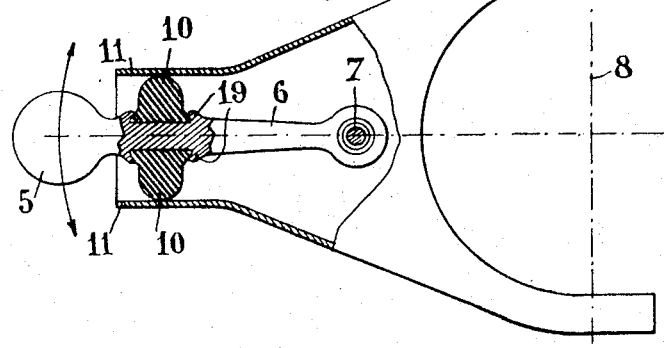
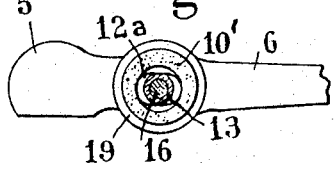
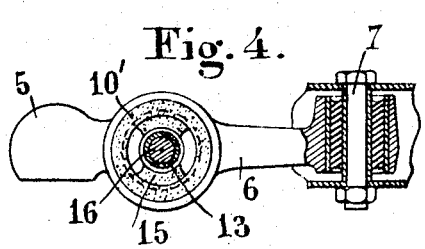
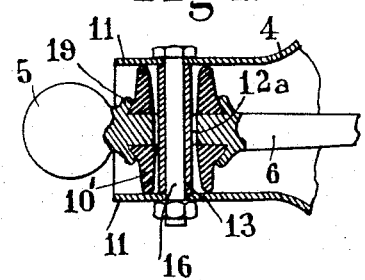
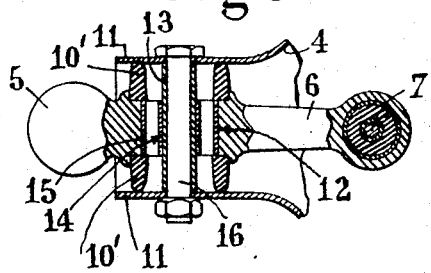

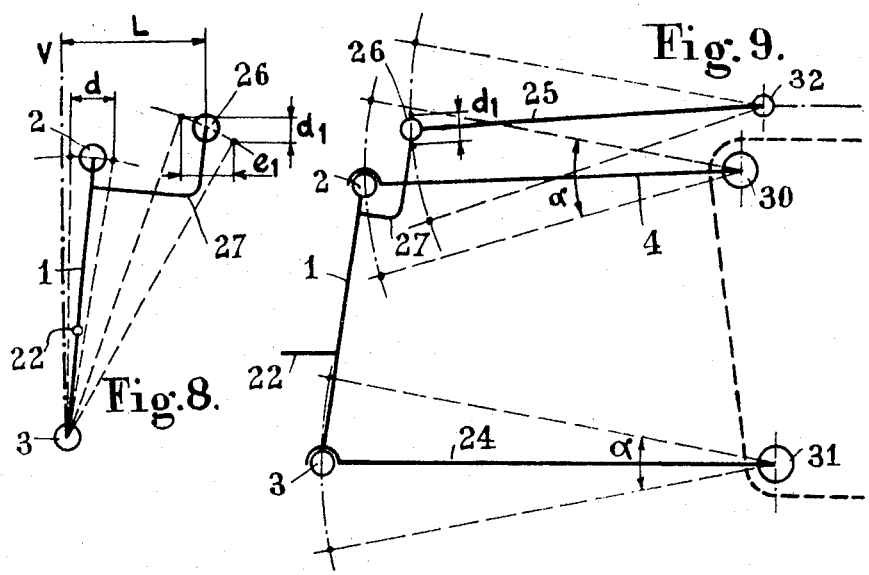
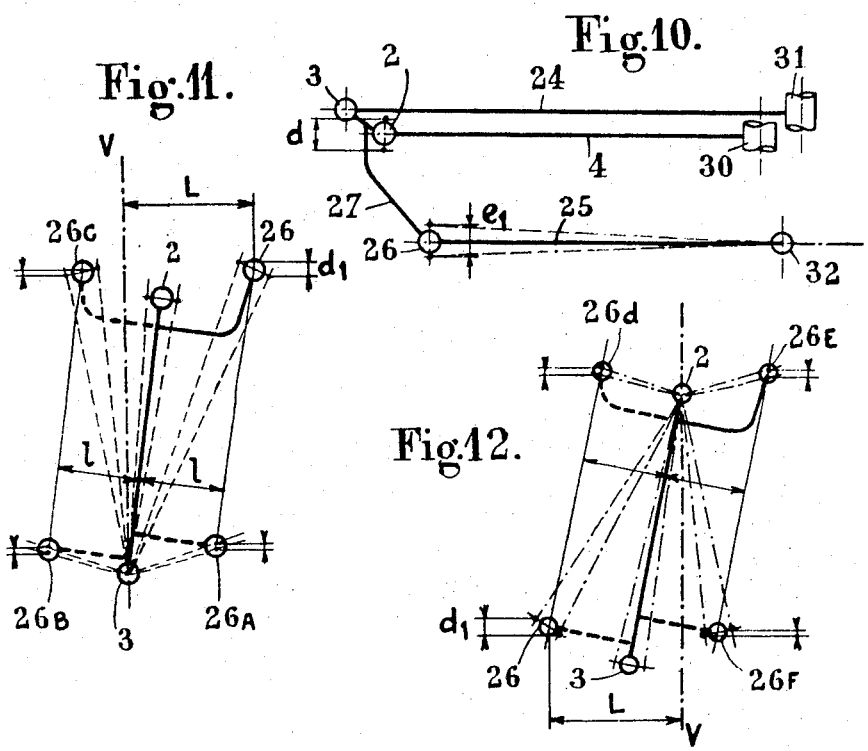

United States Patent Office 3,467,406
Patented Sept. 16, 1969

3,467,406
SUSPENSION SYSTEMS OF VEHICLES
Edmond Henry-Biabaud, Paris, France, assignor to
Societe Anonyme Andre Citroen, Paris, France
Filed Oct. 10, 1967, Ser. No. 674,149
Claims priority, application France, Nov. 18, 1966,
84,190
Int. Cl. B60g 3/20, 11/00
U.S. Cl. 280—96.2                                  8 Claims

ABSTRACT OF THE DISCLOSURE

This suspension device for a vehicle wheel comprises a knuckle supporting the stub axle of the jointly steerable and driven wheel, together with two ball joints for the pair of wheel carrier wishbone links and a ball joint for the steering arm; one of the ball joints is pivoted to the end of a lever pivoted freely on one of the wishbone links, whereby this ball joint can move longitudinally in a horizontal plane, the other joint constituting a fixed point.

FIELD OF THE INVENTION

This invention relates to a vehicle wheel suspension having a longitudinal flexibility permitting the movement of the wheel in relation to the frame in a direction parallel to the longitudinal center line of the vehicle.

SUMMARY OF THE INVENTION

This invention relates in general to suspension systems of automotive vehicles and has specific reference to a wheel suspension device providing a longitudinal flexibility.

It is known that road unevennesses by causing wheel beats in the plane of each wheel are a source of vibration and noise transmitted through the wheel supports. It is the essential object of this invention to damp out the longitudinal components of this vibration and therefore to reduce driving noise accordingly.

To this end the present invention provides a longitudinal-flexibility mounting of the wheel hub support or knuckle which permits a certain horizontal movement of the wheel in relation to the frame, in a direction parallel to the longitudinal center line of the vehicle. The median plane of the wheel remains substantially undisturbed during this movement and therefore the road holding properties of the vehicle are not affected by this mounting.

In this arrangement this suspension system comprises a knuckle supporting the wheel stub axle, two ball joints for the two wishbone arms, one of the ball joints of the wheel knuckle acts as an oscillation fulcrum, the other ball joint permitting the aforesaid longitudinal movement.

The ball joint permitting this longitudinal movement may be the lower or upper ball joint of the assembly.

It is advantageous that the ball joint supporting the weight of the vehicle be the one not subjected to any longitudinal movement.

This arrangement is applicable to a driving or non-driving wheel, as well as to a steerable or non-steerable wheel.

In the case of a steerable wheel it is advantageous to so select the position of the pivotal connection between the steering arm or rod and the wheel hub carrier or knuckle that the movement thereof which is caused by the longitudinal displacement of the ball joint cannot appreciably modify the plane of the wheel.

According to a specific form of embodiment of this invention, the ball joint adapted to move longitudinally is mounted at the end of a lever pivoted about an axis extending at right angles to the plane of, and rigid with, the wheel carrier or wishbone link. The permissible movements of this lever are limited by lateral resilient pads, stops or bushes.

In case the knuckles, although unloaded, transmitted relatively heavy vertical stress to said lever (for example in the case of an anti-roll bar secured to the non-carrier wheel wishbone link) the lever may comprise in the vicinity of said ball joint a horizontal bore adapted to slide along a pivot pin rigid with the link and engaging said bore.

In order to afford a clearer understanding of this invention and of the manner in which the same may be carried out in practice, reference will now be made to the accompanying drawings in which typical forms of embodiment of the suspension system of this invention are illustrated diagrammatically by way of example.

BRIEF DESCRIPTION OF THE DRAWINGS

FIGURE 1 is a perspective view showing a wheel mounting, in this case a steerable wheel;

FIGURE 2 is a vertical section taken in a plane containing the axis of the wishbone link in which the joint is mounted;

FIGURE 3 is a plan view and fragmentary section of the wishbone link with the lever carrying the ball joint;

FIGURES 4 and 5 illustrate a first modified form of embodiment of the lever subjected to relatively heavy vertical stress;

FIGURES 6 and 7 are similar views showing another modified form of embodiment of the lever subjected to relatively heavy vertical stress;

FIGURES 8 to 12 are diagrams illustrating the selection of the position of the steering-arm ball joint on the knuckle.

DESCRIPTION OF THE PREFERRED EMBODIMENTS

The wheel suspension illustrated by way of example comprises a steering knuckle 1 supporting the wheel stub axle 22, a pair of upper and lower ball joints 2 and 3 respectively, and two wheel carrier arms or wishbone links 4 and 24 provided to the vehicle frame and receiving said ball joints, respectively. The steering bar 25 is pivoted through a ball joint 26 to the steering arm 27 integral with the knuckle 1. In the case of a steerable and driven wheel the stub axle 22 is connected to a drive shaft 28 (FIGURE 1).

According to this invention, one of the two ball joints, i.e., the upper ball joint 2 in this example, has a certain horizontal flexibility or is adapted to move in a horizontal longitudinal direction with respect to the vehicle. To this end this ball joint is not secured directly to the wishbone link 4 but to a lever 6 adapted to pivot freely about its pivot pin 7 mounted in the hollow wishbone link 4 pivoted in turn about the axis 8 on the frame of the vehicle (not shown).

This horizontal movement of the outer end of lever 6 which engages the ball joint 2 is limited by resilient bushes, stops or pads 10 fitted in recesses 19 formed in said lever 6 and engaging the front and rear walls 11 of wishbone link 4.

In FIGURES 4, 5, 6 and 7 various modified forms of embodiment are illustrated wherein the non-carrying pivot means (which in this case is a suspension ball joint) is adapted to transmit relatively considerable vertical stress; the lever 6 still pivoted to the wishbone link through a pivot pin opposite to the ball joint receives in addition a horizontal spindle located near said ball joint. In each case specific arrangements permit the longitudinal movement of the ball joint and the movement of said lever in relation to the horizontal axis which results therefrom. In fact, this movement, due to the provision of the pivot pin 7, is not a simple axial sliding movement.

In the alternate form of embodiment illustrated in FIGURES 4 and 5 the lever 6 has formed between its pivot pin 7 and the socket 5 of ball joint 2 a bore 12 extending at right angles to said pivot pin 7 and provided with an annular rubber bushing or silent block 10' formed with cavities disposed in a horizontal plane, said bushing or silent block being adapted to slide by means of its bore 14 along a sleeve 13 extending therethrough; this sleeve 13 is clamped at its ends between the walls 11 of the wishbone link 4 by means of a bolt 16.

In the modified arrangement shown in FIGURES 6 and 7 the lever 6 is guided without any vertical play along the sleeve 13 rigid with link 4 by means of an aperture 12a elongated in the horizontal plane.

FIGURES 8, 9, 10, 11, and 12 are explanatory diagrams illustrating the selection of the proper position of the ball joint 26 for pivoting the steering arm 27 to the knuckle 1.

The movement of the suspension ball joint according to this invention causes an oscillatory motion to develop about the fixed ball joint of the knuckle and consequently of the steering ball joint rigid therewith.

Assuming that the steering bar 25 were uncoupled, it will be noted that the movement of the suspension ball joint causes a variation in the distance from the ball joint 26 pivotally connecting the steering arm 27 to the knuckle 1 to the ball joint 32 controlling the steering movements.

Actually, as this distance is kept to a constant value by the bar 25 and as the ball joint 32 is fixed, an untimely and undesired turning of the knuckle 1 about the axis of ball joints 2 and 3 is produced. Therefore, some means must be provided to reduce as much as possible the influence exerted by the movement of the suspension ball joint on the angular positions of the knuckle 1.

This movement of the steering ball joint has two components: a vertical component $d_1$ and a horizontal component $e_1$, as shown in FIGURE 8.

The effects of the vertical component $d_1$ are illustrated in FIGURE 9 showing a projection onto a transverse vertical plane of a transverse parallel-link suspension system comprising the knuckle 1 connected to ball joints 2 and 3 to the upper suspension wishbone link 4 and to the lower suspension wishbone link 24 pivoted to the vehicle frame by means of pivot pins 30 and 31, respectively, said knuckle being connected through the steering ball joint 26 to the steering bar 25 having its opposite end pivoted to the steering control ball joint 32.

The effects produced by the horizontal component $E_1$ are illustrated in FIGURE 10 which is a horizontal projection of the same elements.

In FIGURES 9 and 10 it is clear that due to the inclination to the horizontal of the steering bar 25 the vertical component $d_1$ introduces a greater angular error in the knuckle than that caused by the horizontal component $e_1$ disposed at right angles to the horizontal projection of steering bar 25.

The smaller the distance L from the ball joint 26 to the vertical transverse plane V containing the fixed ball joint, the smaller the vertical movement $d_1$. Thus, for a same length $l$ of the steering arm, FIGURE 11 shows various steering ball joint positions $26_A$, $26_B$, $26_C$ which are more advantageous than the position 26 for the displacement $d$. Similarly, in FIGURE 12, wherein the fixed knuckle pivot is the upper ball joint 2, it will be seen that the positions $26_D$, $26_E$ and $26_F$ are more advantageous than position 26.

What I claim is:
1. A vehicle wheel suspension device adapted to impart a longitudinal flexibility to the wheel in relation to the vehicle frame, which comprises a knuckle supporting the wheel stub-axle, a pair of upper and lower ball joints mounted on said knuckle, a pair of links having one end pivoted to the vehicle frame, carrier pivot means of one of said links on one of said ball joints, a lever pivoting about a vertical pivot pin secured to the other link and having its free end pivoted to the other ball joint, resilient stop means limiting the pivotal movements of said lever in relation to said other link, a steering arm rigid with said knuckle, a ball joint mounted on said knuckle, a steering rod pivoted to said ball joint, said pivoting lever having formed intermediate its end a bore extending at right angles to its vertical axis of oscillation on the link, a pivot pin extending through the bore, said pivoting lever adapted to slide along said pivot pin, the space left between said horizontal pivot pin and said bore being filled by a resilient bush.

2. A vehicle suspension device as set forth in claim 1, which comprises a resilient annular bush carried by the horizontal pivot pin guiding said lever.

3. A vehicle suspension device adapted to impart a longitudinal flexibility to the wheel in relation to the vehicle frame, which comprises a knuckle supporting the wheel stub-axle, a pair of upper and lower ball joints mounted on said knuckle, a pair of links having one end pivoted to the vehicle frame, carrier pivot means of one of said links on one of said ball joints, a lever pivoting about a vertical pivot pin secured to the other link and having its free end pivoted to the other ball joint, resilient stop means limiting the pivotal movements of said lever in relation to said other link, and wherein said pivoting lever has formed intermediate its ends a bore extending at right angles to its vertical axis of oscillation on said other link and a horizontal pivot pin extending through the bore, said pivoting lever being slidable along said horizontal pivot pin.

4. A vehicle suspension device as set forth in claim 3, wherein the bore formed in said pivoting lever has a larger cross section than that of the horizontal pivot pin, the space left between said horizontal pivot pin and the bore being filled by a resilient bush.

5. A vehicle suspension device as set forth in claim 3, wherein said resilient bush is a resilient annular bush carried by the horizontal pivot pin guiding said pivoting lever.

6. A vehicle suspension device as set forth in claim 5, wherein said resilient annular bush is formed with cavities disposed therein in a horizontal plane.

7. A vehicle suspension device as set forth in claim 3, wherein the bore formed in said pivoting lever has an elongated cross section in the horizontal direction, the smaller dimension of said elongated cross section being such that said pivoting lever is guided without any vertical play along said horizontal pivot pin.

8. A vehicle suspension device as set forth in claim 3, wherein said other link is hollow, said pivoting lever is adapted for horizontal oscillating movement within said other link, and said horizontal pivot pin has its both ends connected to side walls of said other link.

References Cited

UNITED STATES PATENTS

| | | | |
|---|---|---|---|
| 2,873,980 | 2/1959 | McFarland | 280—96.2 |
| 2,882,065 | 3/1959 | Von Rucker | 280—96.2 |
| 3,181,882 | 5/1965 | Rosky et al. | 280—96.2 |

KENNETH H. BETTS, Primary Examiner

U.S. Cl. X.R.

267—63